US012632645B2

(12) United States Patent
El Ouriaghli et al.

(10) Patent No.: US 12,632,645 B2
(45) Date of Patent: *May 19, 2026

(54) PERSONAL DATA DISCOVERY

(71) Applicant: Bank of America Corporation, Charlotte, NC (US)

(72) Inventors: Moncef El Ouriaghli, Charlotte, NC (US); Nishitha Kakani, Mint Hill, NC (US); Sriram Mohanraj, Charlotte, NC (US); Yanghong Shao, Charlotte, NC (US); Timothy L. Atwell, Huntersville, NC (US)

(73) Assignee: Bank of America Corporation, Charlotte, NC (US)

( * ) Notice: Subject to any disclaimer, the term of this patent is extended or adjusted under 35 U.S.C. 154(b) by 49 days.

This patent is subject to a terminal disclaimer.

(21) Appl. No.: 18/751,999

(22) Filed: Jun. 24, 2024

(65) Prior Publication Data

US 2024/0346240 A1     Oct. 17, 2024

Related U.S. Application Data

(63) Continuation of application No. 17/480,312, filed on Sep. 21, 2021, now Pat. No. 12,050,858.

(51) Int. Cl.
| | |
|---|---|
| *G06F 40/18* | (2020.01) |
| *G06F 18/21* | (2023.01) |
(Continued)

(52) U.S. Cl.
CPC .......... *G06F 40/18* (2020.01); *G06F 18/2185* (2023.01); *G06F 21/6245* (2013.01); *G06F 40/20* (2020.01); *G06N 20/00* (2019.01)

(58) Field of Classification Search
None
See application file for complete search history.

(56) References Cited

U.S. PATENT DOCUMENTS

| | | | | |
|---|---|---|---|---|
| 9,369,488 | B2 * | 6/2016 | Woods .................. | H04W 12/08 |
| 9,495,345 | B2 * | 11/2016 | Munro .................. | G06F 16/288 |

(Continued)

FOREIGN PATENT DOCUMENTS

| | | |
|---|---|---|
| CN | 110995812 A | 4/2020 |
| KR | 102266153 B1 | 6/2021 |

OTHER PUBLICATIONS

Hardik, Dave; Active Learning Sampling Strategies [online], May 29, 2020; [retrieved on Aug. 23, 2021]. Retrieved from the Internet <URL: https://towardsdatascience.com/active-learning-sampling-strategies-f8d8ac7037c8>.

(Continued)

*Primary Examiner* — Kambiz Zand
*Assistant Examiner* — Mahabub S Ahmed
(74) *Attorney, Agent, or Firm* — Banner & Witcoff, Ltd.

(57) ABSTRACT

Artificial-intelligence computer-implemented processes and machines predict whether personal data may be present in structured software based on metadata field(s) contained therein. Natural language processing preprocesses input strings corresponding to the metadata field(s) into normalized input sequence(s). Individual characters in the sequence(s) are embedded into fixed-dimension vectors of real numbers. Bidirectional LSTM(s) or other machine-learning algorithm(s) are utilized to generate forward and backward contextualization(s). Neural network output(s) are provided based on element-wise averaging or feed forwarding based on the contextualization(s) in order to predict whether one or more value fields corresponding to the metadata field(s) may contain personal data.

12 Claims, 5 Drawing Sheets

(51) Int. Cl.
  *G06F 21/62*         (2013.01)
  *G06F 40/20*         (2020.01)
  *G06N 20/00*         (2019.01)

(56)                   References Cited

U.S. PATENT DOCUMENTS

| | | | | |
|---|---|---|---|---|
| 10,169,315 | B1 * | 1/2019 | Heckel | G06F 40/166 |
| 10,452,862 | B2 | 10/2019 | Wyatt et al. | |
| 10,515,317 | B1 * | 12/2019 | Kenthapadi | G06Q 50/01 |
| 10,803,391 | B2 * | 10/2020 | Sharifi | G06N 20/00 |
| 11,017,173 | B1 * | 5/2021 | Lu | G06N 3/08 |
| 11,144,669 | B1 * | 10/2021 | Rao | G06N 7/01 |
| 11,256,707 | B1 * | 2/2022 | Xiong | G06N 3/09 |
| 11,514,096 | B2 * | 11/2022 | Psota | G06F 16/35 |
| 11,816,243 | B2 * | 11/2023 | Lai | G06F 40/30 |
| 11,914,674 | B2 * | 2/2024 | Zadeh | G06N 3/044 |
| 12,045,316 | B2 * | 7/2024 | Côté | G06F 18/2178 |
| 2005/0091524 | A1 * | 4/2005 | Abe | H04L 63/04 |
| | | | | 726/26 |
| 2006/0005247 | A1 * | 1/2006 | Zhang | G06F 21/6245 |
| | | | | 707/E17.084 |
| 2006/0048224 | A1 * | 3/2006 | Duncan | G06F 21/6218 |
| | | | | 726/22 |
| 2007/0282595 | A1 * | 12/2007 | Tunning | G06F 16/3329 |
| | | | | 704/9 |
| 2012/0303558 | A1 * | 11/2012 | Jaiswal | G06N 20/00 |
| | | | | 706/12 |
| 2014/0359691 | A1 * | 12/2014 | Woods | H04L 63/14 |
| | | | | 726/1 |
| 2016/0162456 | A1 * | 6/2016 | Munro | G06F 16/24532 |
| | | | | 704/9 |
| 2017/0032257 | A1 * | 2/2017 | Sharifi | G06F 16/36 |
| 2017/0091320 | A1 * | 3/2017 | Psota | G06F 16/3337 |
| 2017/0193083 | A1 * | 7/2017 | Bhatt | G06F 16/3344 |
| 2018/0053108 | A1 * | 2/2018 | Olabiyi | G06N 3/09 |
| 2018/0203836 | A1 * | 7/2018 | Singh | G06N 3/0499 |
| 2018/0349483 | A1 | 12/2018 | Carlisle et al. | |
| 2019/0213480 | A1 * | 7/2019 | Lim | G06N 3/098 |
| 2019/0236486 | A1 * | 8/2019 | Azab | G06F 40/216 |
| 2019/0303726 | A1 * | 10/2019 | Côté | H04L 41/0631 |
| 2019/0311210 | A1 * | 10/2019 | Chatterjee | G06V 20/62 |
| 2019/0332658 | A1 * | 10/2019 | Heckel | G06N 3/048 |
| 2020/0014541 | A1 * | 1/2020 | Streit | G06N 3/08 |
| 2020/0020326 | A1 * | 1/2020 | Srinivasan | G06N 3/09 |
| 2020/0152330 | A1 * | 5/2020 | Anushiravani | G06F 18/30 |
| 2020/0226470 | A1 * | 7/2020 | Storm | G06N 3/048 |
| 2020/0250139 | A1 * | 8/2020 | Muffat | G06N 20/00 |
| 2020/0265196 | A1 * | 8/2020 | Ravi | G06F 40/44 |
| 2020/0311273 | A1 * | 10/2020 | Knox | G06N 5/02 |
| 2020/0358611 | A1 * | 11/2020 | Hoang | G06N 3/045 |
| 2021/0065130 | A1 * | 3/2021 | Lee | G06Q 10/1097 |
| 2021/0097502 | A1 * | 4/2021 | Hilleli | G06N 3/08 |
| 2021/0125297 | A1 * | 4/2021 | Doran | G06F 21/6245 |
| 2021/0182077 | A1 * | 6/2021 | Chen | G06F 9/445 |
| 2021/0182661 | A1 * | 6/2021 | Li | G06N 3/096 |
| 2021/0224922 | A1 * | 7/2021 | Juban | G06N 20/00 |
| 2021/0326746 | A1 * | 10/2021 | Dayama | G06N 20/00 |
| 2021/0342546 | A1 * | 11/2021 | Beigi | G06N 3/044 |
| 2021/0365775 | A1 * | 11/2021 | S Nayar | G06N 3/0464 |
| 2021/0375441 | A1 * | 12/2021 | Aggarwal | G06F 40/40 |
| 2021/0406266 | A1 * | 12/2021 | Chan | G06N 3/045 |
| 2021/0406780 | A1 * | 12/2021 | Lesner | G06F 18/285 |
| 2021/0409430 | A1 * | 12/2021 | Alford | H04L 67/133 |
| 2022/0012633 | A1 * | 1/2022 | Molahalli | H04L 41/50 |
| 2022/0019745 | A1 * | 1/2022 | Jin | G06N 3/09 |
| 2022/0036003 | A1 * | 2/2022 | Bali | G06F 40/30 |
| 2022/0067500 | A1 * | 3/2022 | Choque | G06N 3/08 |
| 2022/0114603 | A1 * | 4/2022 | Bonat | G06N 3/09 |
| 2022/0121884 | A1 * | 4/2022 | Zadeh | G06N 3/006 |
| 2022/0121949 | A1 * | 4/2022 | Chang | G06N 3/082 |
| 2022/0232353 | A1 * | 7/2022 | Badros | G10L 15/26 |
| 2022/0249906 | A1 * | 8/2022 | Phillips | A61B 5/7264 |
| 2022/0277735 | A1 * | 9/2022 | Mukherjee | G10L 15/197 |
| 2022/0309332 | A1 * | 9/2022 | V V Ganeshan | G06F 40/232 |
| 2022/0393994 | A1 * | 12/2022 | Kulkarni | G06N 7/01 |
| 2023/0018116 | A1 * | 1/2023 | Walsh | G06F 21/60 |
| 2023/0022845 | A1 * | 1/2023 | Meng | G06Q 10/10 |
| 2023/0027526 | A1 * | 1/2023 | Kim | G06F 40/30 |
| 2023/0061731 | A1 * | 3/2023 | Sengupta | G06N 3/045 |
| 2023/0065915 | A1 * | 3/2023 | Berestovsky | G06F 18/22 |
| 2023/0274420 | A1 * | 8/2023 | Seah | G06N 3/096 |
| | | | | 382/128 |

OTHER PUBLICATIONS

Tensor Flow [online]; [retrieved on Aug. 23, 2021]. Retrieved from the Internet <URL: https://www.tensorflow.org/api_docs/python/tf/keras>.

* cited by examiner

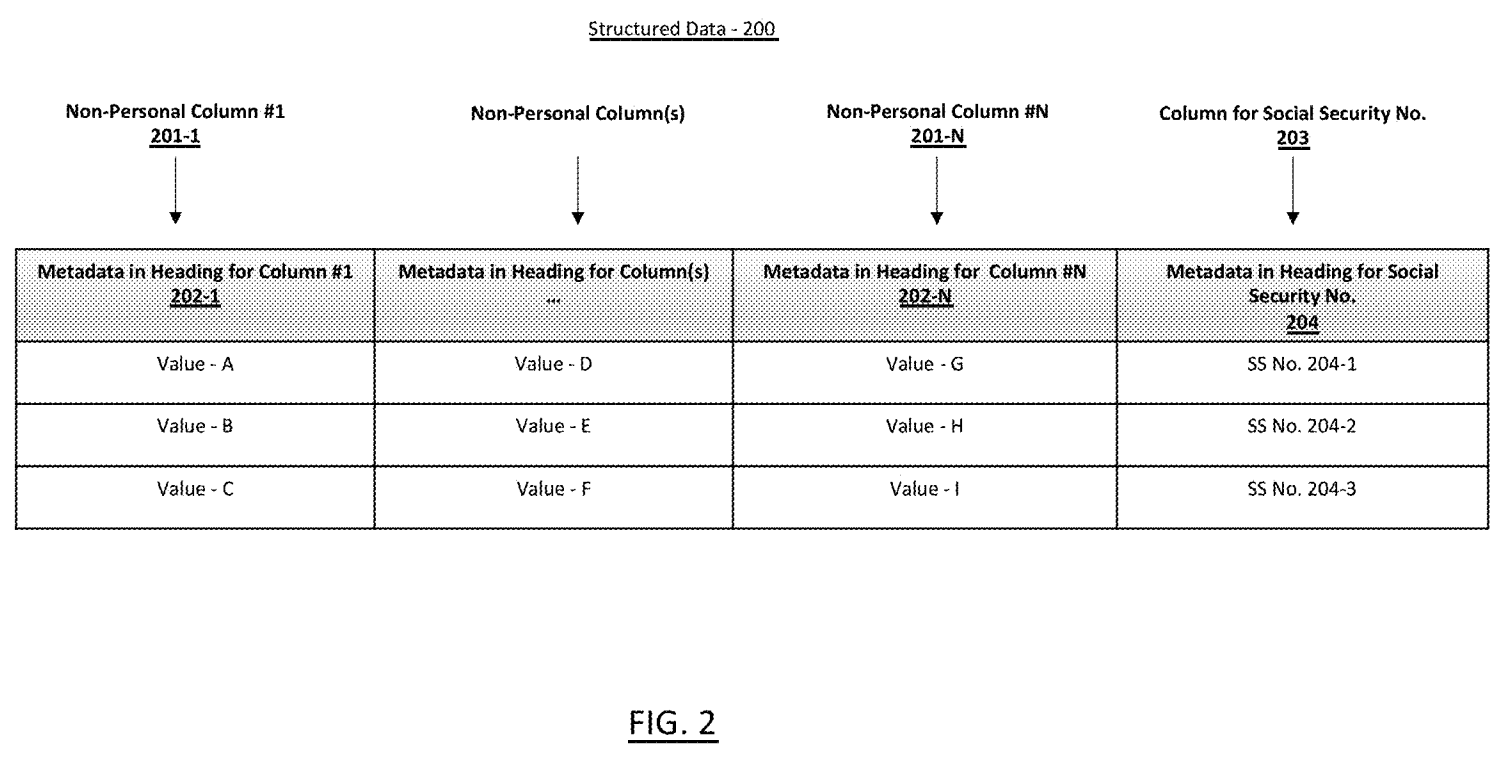

Structured Data - 200

| Metadata in Heading for Column #1<br>202-1 | Metadata in Heading for Column(s)<br>... | Metadata in Heading for Column #N<br>202-N | Metadata in Heading for Social Security No.<br>204 |
|---|---|---|---|
| Value - A | Value - D | Value - G | SS No. 204-1 |
| Value - B | Value - E | Value - H | SS No. 204-2 |
| Value - C | Value - F | Value - I | SS No. 204-3 |

Non-Personal Column #1
201-1

Non-Personal Column(s)

Non-Personal Column #N
201-N

Column for Social Security No.
203

FIG. 2

Output Layer
Dimension=No. of Classes=2

Feed Forward Layer
Dimension=4

Concatenation
Dimension=16

Bidirectional LSTM
Cell Size=8

Character Embeddings
Dimension=12

Input String
Max length=50

PERSONAL DATA DISCOVERY

CROSS REFERENCE TO RELATED APPLICATION(S)

This application is a continuation of and claims priority to U.S. patent application Ser. No. 17/480,312 entitled "Personal Data Discovery" filed Sep. 21, 2021 which is incorporated by reference in its entirety.

TECHNICAL FIELD OF DISCLOSURE

The present disclosure relates to processes and machines for information security including monitoring or scanning of software or data metadata to, inter alia, prevent or detect attacks, as well as address jurisdictional issues, by identifying and/or validating personal data, such as proprietary information and highly confidential information, within structured data sources or software applications.

BACKGROUND

As a result of emerging and constantly evolving privacy and regulatory requirements that can vary in different jurisdictions and countries throughout the world, there is a business need for a scalable and sustainable tool/model to identify personal data within structured data sources or software applications. Personal data can range from proprietary information (e.g., person number, job code, job title, etc.) to highly confidential information (e.g., social security numbers, credit card numbers, passport numbers, telephone numbers, addresses, personal contact information, etc.) and/or sensitive personal information (e.g., religion, medical records, gender, etc.). Failure to identify such personal information in accordance with privacy laws, rules, and regulations could subject companies to potential regulatory compliance, material, and/or reputational risks.

Current information-security processes and machines are unable to efficiently identify, manage, store, and utilize such personal information without putting the data at risk. Further, such prior art processes and machines typically require database access and/or potentially encounter permissible-use issues, impediments, or problems. Oftentimes, application owners are responsible to manually maintain information about their applications and keep it up to date. Within this process, application owners have to identify personal data and classify it as confidential/proprietary and list all personal data elements/categories within the applications. This manual process is laborious and may not be frequently performed resulting in errors.

This is further complicated in view of new and varying input data feeds or data content in applications as they are developed, pushed into production, and/or decommissioned on a daily or other potentially frequent basis such that input data is constantly changing. There are additional complications due to variability from differing product perspectives such as SQL or Oracle databases or the like. Consequently, attempting to address the data is usually a moving target and current approaches towards handling various aspects of these problems are not proactive or effective.

Improved, light weight, and scalable processes, machines, natural language processing, machine learning, or other artificial intelligence tools/models for quickly scanning, identifying, predicting, classifying, redacting, and/or remediating various types of personal data/elements in structured data sources and software applications across some or all enterprise data assets—without requiring database access or analyzing the data contained therein—are therefore needed to overcome various problems in the prior art.

SUMMARY

Aspects of this disclosure address one or more of the shortcomings in the industry by, inter alia, utilizing artificial-intelligence computer-implemented processes and machines to predict whether personal data may be present in structured software based on metadata field(s) contained therein. Natural language processing can preprocess input strings corresponding to the metadata field(s) into normalized input sequence(s). Individual characters in the sequence(s) can be embedded into fixed-dimension vectors of real numbers. Bidirectional LSTM(s) or other machine-learning algorithm(s) can be utilized to generate forward and backward contextualization(s). Neural network output(s) can be feed-forwarded based on the contextualization(s) in order to predict whether one or more value fields corresponding to the metadata field(s) may contain personal data. These and the other approaches described herein enable predictions and/or determinations regarding personal data to be made based on the contents of the metadata field(s) themselves without the need for access to the data contained in the structured software.

In light of the foregoing background, the following presents a simplified summary of the present disclosure in order to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions of this application are disclosed in the specification throughout this application along with exemplary, non-exhaustive, and non-limiting manners and processes of making and using the inventions, in such full, clear, concise, and exact terms in order to enable skilled artisans to make and use the inventions without undue experimentation and sets forth the best mode contemplated by the inventors for carrying out the inventions.

In accordance with one or more arrangements of the disclosures contained herein, solution(s) are provided to predict and/or determine whether personal data may be present in data value fields or cells within structured software (e.g., databases, spreadsheets, or comma-separated-values (CSV) files) based on corresponding metadata fields (e.g., column headings).

In some arrangements, artificial-intelligence process, machines, and/or computer-executable instructions may be implemented to provide functions such as natural language processing, by preprocessing layer(s) in application(s), metadata field(s) in the structured software into normalized input sequence(s); embedding, by embedding layer(s) in the application(s), individual characters in the normalized input sequence(s) into fixed-dimension vectors of real numbers in order to generate embedding matri(cies); generating, by supervised machine-learning layer(s) (e.g., bidirectional Long Short Term Memory (LSTM) or other supervised learning algorithm(s)), machine-learned vector(s) (e.g., forward and backward concatenation(s) of bidirectional LSTM(s) and/or averaged vectors) based on the embedding matri(cies); processing, by a processing layer, the machine-learned vector by element-wise averaging or feed forwarding into an output argument; and outputting, by an output layer in the application based on the output argument, a two-node neural-network or other output based on the output argument that indicates a probability of whether personal data may exist in various value fields corresponding to the metadata headings in question.

In some arrangements, bidirectional LSTM may include one or more LSTM units that have a cell for temporarily storing at least one value over one or more time intervals as well as an input gate, an output gate, and a forget gate in which the gates regulate a flow of information into and out of the cell.

In some arrangements, natural language processing may include various preprocessing of input string(s) corresponding to the metadata field(s) such as: whitespace stripping, case conversion, tokenization of one or more names within the metadata field(s) at a character level and conversion of characters in metadata field(s) into integer indices; and padding or truncating the normalized input sequence in order to match a consistent predetermined length.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

FIG. 2 illustrates a sample structured-data object from which various metadata can be extracted in accordance with certain aspects of the present disclosure.

DETAILED DESCRIPTION

Figure 1:
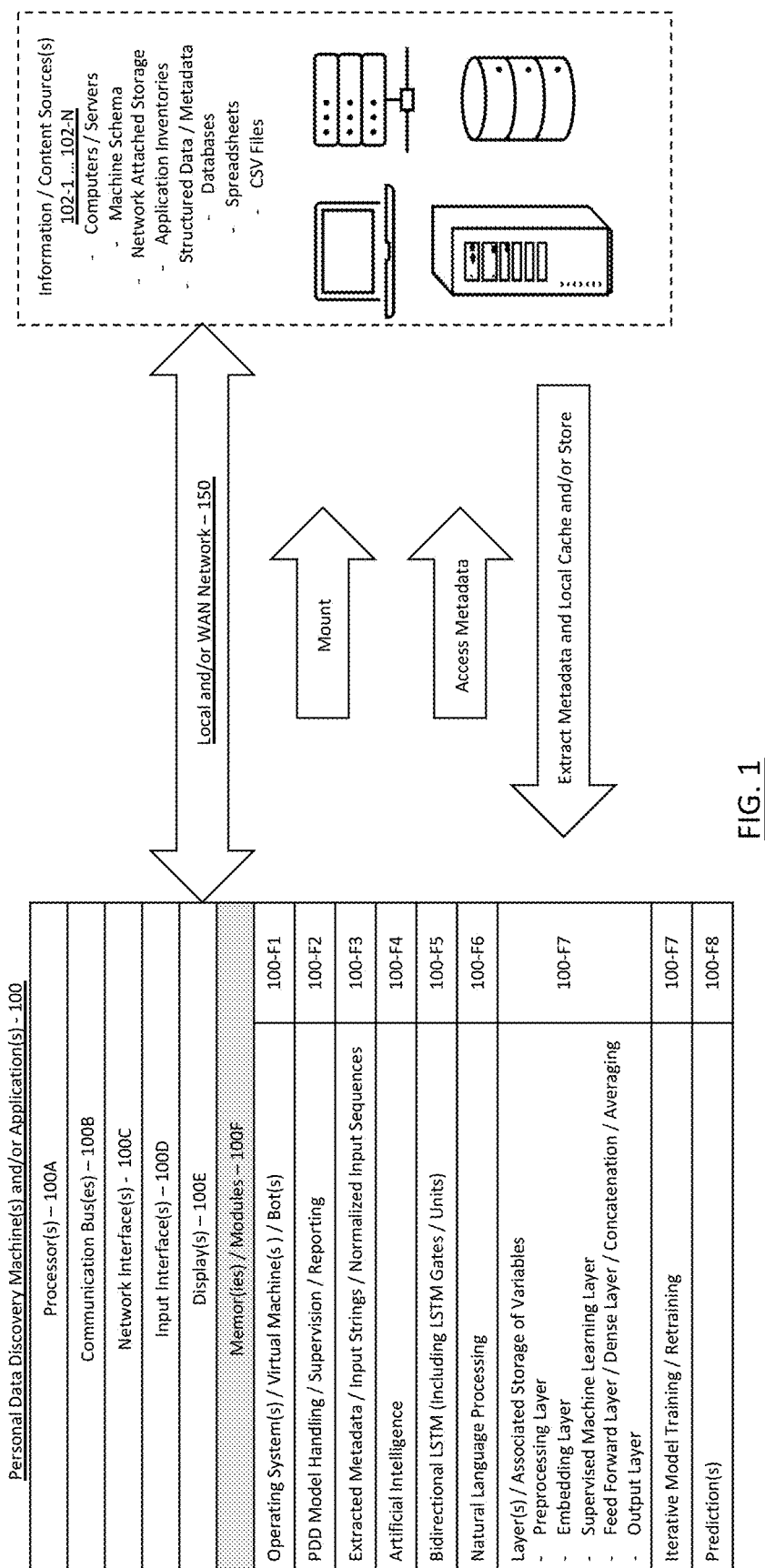
FIG. 1 depicts exemplary operating environment(s) and functionality for personal data discovery machine(s) and/or application(s) including sample network traffic and various information and/or content sources in which certain aspects of the present disclosure may be implemented.

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized and structural and functional modifications may be made. It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable instructions can include one or more: active-learning, algorithms, applications, application program interfaces (APIs), attachments, big data, daemons, emails, encryptions, databases, datasets, drivers, data structures, file systems or distributed file systems, firmware, graphical user interfaces, images, instructions, machine learning categories (i.e., supervised, semi-supervised, reinforcement, and unsupervised), machine learning algorithms (e.g., bidirectional LSTM, Logistic Regression, XG Boost, Random Forest, etc.), middleware, modules, objects, operating systems, processes, protocols, programs, scripts, tools, and utilities. The computer-executable instructions can be on tangible, computer-readable memory (local, in network-attached storage, remote, or cloud-based), can be stored in volatile or non-volatile memory, and can operate autonomously, on-demand, on a schedule, spontaneously, proactively, and/or reactively.

"Computers" can include one or more: general-purpose or special-purpose network-accessible administrative computers, clusters, computing devices, computing platforms, desktop computers, distributed systems, enterprise computers, laptop or notebook computers, controlling computers, nodes, personal computers, portable electronic devices, servers, controlled computers, smart devices, tablets, and/or workstations, which have one or more microprocessors or executors for executing or accessing the computer-executable software and data. References to computer machines, servers, clients, names of devices, etc. within this definition are used interchangeably in this specification and are not considered limiting or exclusive to only a specific type of device. Instead, references in this disclosure to computers and the like are to be interpreted broadly as understood by skilled artisans. Further, as used in this specification, computers also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing. A computer network includes any transport that supports HTTP.

FIG. 1 depicts exemplary operating environment(s) and functionality for personal data discovery machine(s) and/or application(s) including sample network traffic and various information and/or content sources in which certain aspects of the present disclosure may be implemented.

One or more personal data discovery, artificial-intelligence, virtual or physical machines, applications, and/or instances 100 may include one or more processors 100A, one or more data or communication buses 100B, one or more wired or wireless network interfaces 100C, various input devices or interfaces 100D, and one or more displays 100E, as well as one or more memories that may contain various software or data modules 100F.

Memor(ies)/module(s) 100F, may be volatile or non-volatile, and may include computer instructions, software, and/or data such as, for example, one or more program modules having instructions that when executed by processor(s) 100A cause machine(s), application(s), or instance(s) to perform one or more functions and/or may store or otherwise maintain information which may be used by such program module(s) and/or processor(s) 100A. Sometimes, one or more program modules and/or databases may be stored by and/or maintained in different memory units of a computer machine and/or by different computing devices that may form and/or otherwise make up a collection of computer machines.

The memory or memories 100F for the personal data discovery machine (or the like) and/or applications 100 may include modules and/or data corresponding to Operating System(s)/Virtual Machine(s)/Bot(s) 100-F1, PDD Model Handling/Supervision/Reporting 100-F2, Extracted Metadata/Input Strings/Normalized Input Sequences 100-F3, Artificial Intelligence 100-F4, Bidirectional LSTM (Including LSTM Gates/Units) 100-F5, Natural Language Processing 100-F6, Layer(s)/Associated Storage of Variables (e.g., Preprocessing Layer, Embedding Layer, Supervised Machine Learning Layer, Feed Forward Layer/Dense Layer/ Concatenation/Averaging, Output Layer, etc.) 100-F7, and Iterative Model Training/Retraining 100-F7, and Prediction(s) 100-F8.

Machine(s) and/or application(s) 100 may communicate over a local network, wide area network, the Internet, or the like 150 with any number, location, and/or type of Information/Content Sources(s) 102-1 . . . 102-N including, for example, Computers/Servers, Machine Schema, Network Attached Storage, Application Inventories, Structured Data/ Metadata, Databases, Spreadsheets, CSV Files, etc. or the like. In particular, machine(s) and/or applications can mount and/or access metadata stored or contained in the foregoing in or corresponding to any type of application or file and can extract some or all such metadata. The extracted metadata can be locally cached and/or stored if desired on machine(s) or in application(s) 100 for processing in accordance with one or more aspects of this invention.

By way of non-limited reference and explanation, a generic, sample, structured-data object and/or file 200 from which various metadata can be extracted in accordance with certain aspects of the present disclosure is illustrated in FIG. 2. The sample structured data 200 in FIG. 2 can be in the form of a spreadsheet, CSV file, table, etc. or the like. Structured data 200 may contain any number and/or type of columns 201-1 . . . 201N that do not contain personal information as well as any number and/or type of columns that contain personal information 203 such as social security numbers in this example. Metadata corresponding to the columns of data in the structured object 200 can be located in column headings (or in other locations) 202-1 through 202-N and 204.

In accordance with one or more aspects of this disclosure, a determination and/or prediction can be made of whether structured data 200 contains any personal information by inspection of only the metadata 202-1 . . . 202-N and 204 in the object 200 as opposed to actual inspection of the individual values Value-A . . . . Value-I or social security numbers 204-1, 204-2, 204-3, etc. contained therein. This obviates prior art problems such as access right issues and provides dramatically improved analysis and processing.

When the model is deployed, the extracted metadata will be pre-processed and the "COLUMN_NAME" field or the like can be leveraged for model scoring in order to predict which of its values (i.e., the actual column names) are personal data element related; based on the probability threshold or the like that is preselected as desired. Then, the model predictions can be shared for cross-verification. There can be any number of personal data elements and each data element can have its own individual binary classifier if desired. This approach offers flexibility to incorporate new data elements to the modeling efforts in accordance with any new and/or updated privacy laws, rules, or regulations; without affecting the pre-developed individual binary models. In addition, this methodology enables individual personal-data elements scanning; satisfying the needs of different regulations (e.g., Belgium Data Protection Act (BDPA), California Consumer Privacy Act (CCPA), General Data Protection Regulation (GDPR), etc.).

Figure 3:
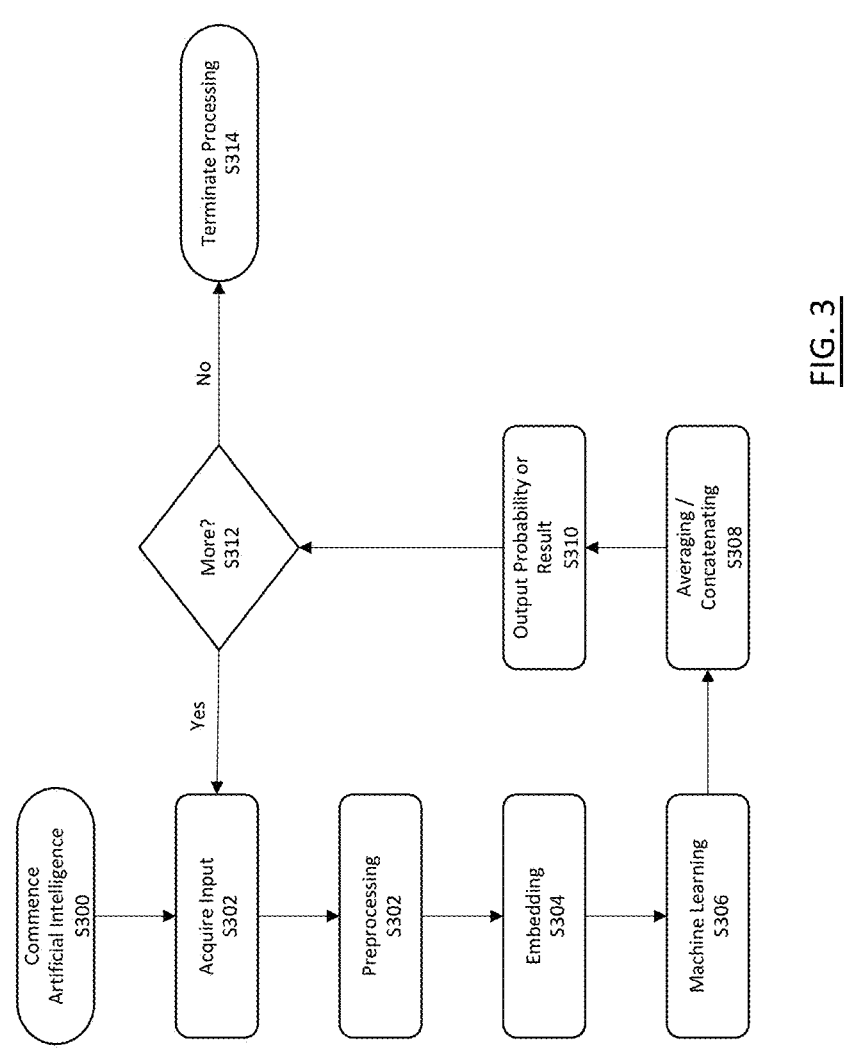
FIG. 3 is a sample artificial-intelligence flow diagram illustrating high-level data acquisition, preprocessing, embedding, machine learning, and other processing in which certain aspects of the present disclosure may be implemented.

FIG. 3 provides a sample artificial-intelligence flow diagram illustrating how certain aspects of the present disclosure may be implemented. An artificial intelligence process can be initiated in S300 on machine(s) or in applications 100. Input can be acquired S302 from Information/Content Sources(s) 102-1 . . . 102-N. This can take the form of mounting, accessing, and then extracting metadata from structured data. It can then be cached, stored, or otherwise situated for handling in accordance with this disclosure.

The extracted metadata can be preprocessed in S302. This can be performed in a preprocessing layer or the like and can include natural language processing or similar functionality in order to create normalized input sequences for analysis. Sample processing can include whitespace stripping and/or case conversion so that each character is of the same case and/or font (e.g., all upper case or all lower case). Other preprocessing can include includes tokenization of one or more names within the metadata field at a character level and conversion of characters in the metadata field into integer indices in order to form a normalized input sequence. Further, the preprocessing can include padding the normalized input sequence if the length is below a threshold (e.g., 50 characters) and truncating the trailing end of the normalized input sequence if the length is greater than the threshold, which will ensure that the normalized input sequences always have the same number of characters contained therein for analysis.

An embedded layer can embed S304 individual characters in the input sequence into fixed-dimension vectors of real numbers in order to generate an embedding matrix. As part of this processing, the padded sequences can be passed as an input to this layer. It can map positive integers (indices of characters) into fixed-dimension vectors of real numbers (embeddings). The embeddings are the parameters (weights) of the neural network which are adjusted during model training to minimize the loss on the 'SSN' identification task. The resulting embedded vectors are representations of characters where similar characters relative to the task are closer to one another in the continuous vector space. The tensor that contains embedding vectors of whole vocabulary is called an "embedding matrix" (M).

Each character index in the padded sequences can be converted to one hot vectors as follows $$\vec{v_i} = \begin{cases} 0 & \text{if } i \neq char_{ind} \\ 1 & \text{if } i = char_{ind} \end{cases}$$

$\vec{v_i}$—a one hot vector of length vocabulary size (vocab), which contains 1 in the position of character index and 0 otherwise. Output of this layer is computed as follows $$\underset{max\_len \times dim}{O} = \underset{max\_len \times vocab}{V} \cdot \underset{vocab \times dim}{M}$$

In the foregoing, the variable designations are vocab—vocabulary size, max_len—padded sequence length, dim—embedding dimension, V—input matrix that contains one hot encodings for each character in the padded sequence, and M—weight matrix that is optimized during the training.

An active-learning approach and/or supervised machine-learning layer can utilize machine learning S306 on or in conjunction with the embedding matrix in order to generate a machine-learned vector based on the embedding matrix. Preferably, the machine learning used in conjunction with at least some aspects of this disclosure is a bidirectional Long Short Term Memory (LSTM) supervised algorithm performed on a character level; however, any type of supervised, semi-supervised, unsupervised, or other machine learning could be used such as, for example, logistic regression, random forest, XGBoost, etc. If bidirectional LSTM is utilized, one or more LSTM units may be incorporated. Each LSTM unit can include a cell for temporarily storing at least one value over one or more time intervals as well as an input gate, an output gate, and a forget gate in which the gates regulate a flow of information into and out of the cell.

The bidirectional LSTM layer can perform two unidirectional LSTM computations simultaneously—forward and backward. The forward LSTM reads the input from start to the end, and the backward LSTM reads the input from end to the start. The basic block of this layer is an LSTM unit as referenced above.

Mathematical equations for the forward pass of an LSTM unit can be as follows and an input vector can be fed to a LSTM unit at each time stamp:

$$x_t \in \mathbb{R}^d$$

$$\text{Front Gate } f_t = \sigma_g(W_f x_t + U_f h_{t-1} + b_f); f_t \in (0, 1)^h$$

$$\text{Input Gate } i_t = \sigma_g(W_i x_t + U_i h_{t-1} + b_i); i_t \in (0, 1)^h$$

$$\text{Output Gate } o_t = \sigma_g(W_o x_t + U_o h_{t-1} + b_o); o_t \in (0, 1)^h$$

$$\text{Cell Input } \tilde{c}_t = \sigma_c(W_c x_t + U_c h_{t-1} + b_c); \tilde{c}_t \in (-1, 1)^h$$

$$\text{Cell State Input } c_t = f_t \cdot c_{t-1} + i_t \cdot \tilde{c}_t; c_t \in \mathbb{R}^h$$

$$W \in \mathbb{R}^{h \times d}, U \in \mathbb{R}^d \text{ and } b \in \mathbb{R}^d;$$

Weight matrices and bias vector parameters which need to be learned during training, where the superscripts d and h refer to the number of input features and number of hidden units, respectively.

Vector averaging and/or concatenation can be performed on the machine-vector output S308 and then the probability calculation, multi-node output, two-node binary result, or other output can be provided S310. If additional personal data searches or processing is to be performed S312, additional input can then be acquired in S302 and the personal data discovery can continue; otherwise, the artificial-intelligence process can terminate S314 if desired.

The output or output layer can be a feed-forward neural-network with number of nodes set to number of output classes (e.g., 2, which represents a binary classifier). Result of this layer can denote probability of each class (e.g., SSN/Not SSN).

Figure 4:
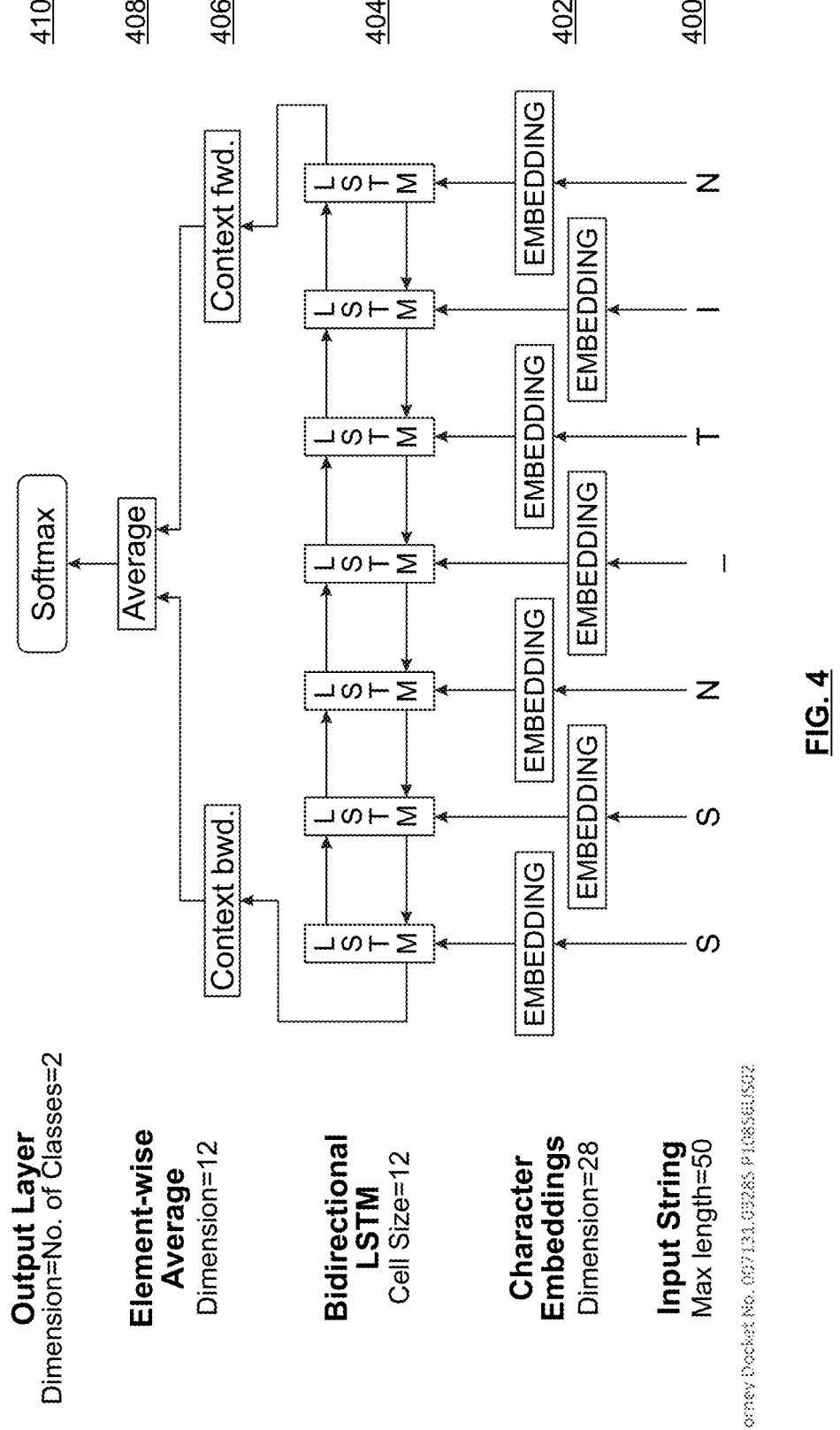
FIG. 4 provides additional granular detail and shows lower-level functionality of the artificial intelligence steps shown in the flow diagram of FIG. 3 in which an element-wise averaging is performed in accordance with certain aspects of the present disclosure.

FIG. 4 provides additional granular detail and shows lower-level functionality of the artificial intelligence steps shown in the flow diagram of FIG. 3 in which an element-wise averaging is performed in accordance with certain aspects of the present disclosure.

Metadata to be analyzed can be extracted from a data structure. The metadata can be in the form of any type of input string 400 such as, for example, "SSN_TIN." The reference to SSN in the input string could indicate the presence of social security numbers being stored in the column values corresponding to that column-heading metadata. The input string could have a maximum length (e.g., 50 characters) if desired or could be any number of characters if preferred. Individual characters can be embedded into fixed-dimension vectors of real numbers 402 (e.g., having a dimension of 28 or other as desired). Bidirectional LSTM 404 can take the fixed-dimension vectors to perform machine learning thereon in order to generate a temporary output such as one or more machine-learned vectors that could provide output forward contextualization as well as a backward contextualization 406. Individual values in the contextualizations can then be averaged or combined as appropriate 408 into an average with a dimension of 12 or other as desired. The average can then be provided to a softmax activation or other function 410 in order to make a determination or generate probability assessment of whether personal data may be contained within the data values corresponding to the analyzed metadata.

Figure 5:
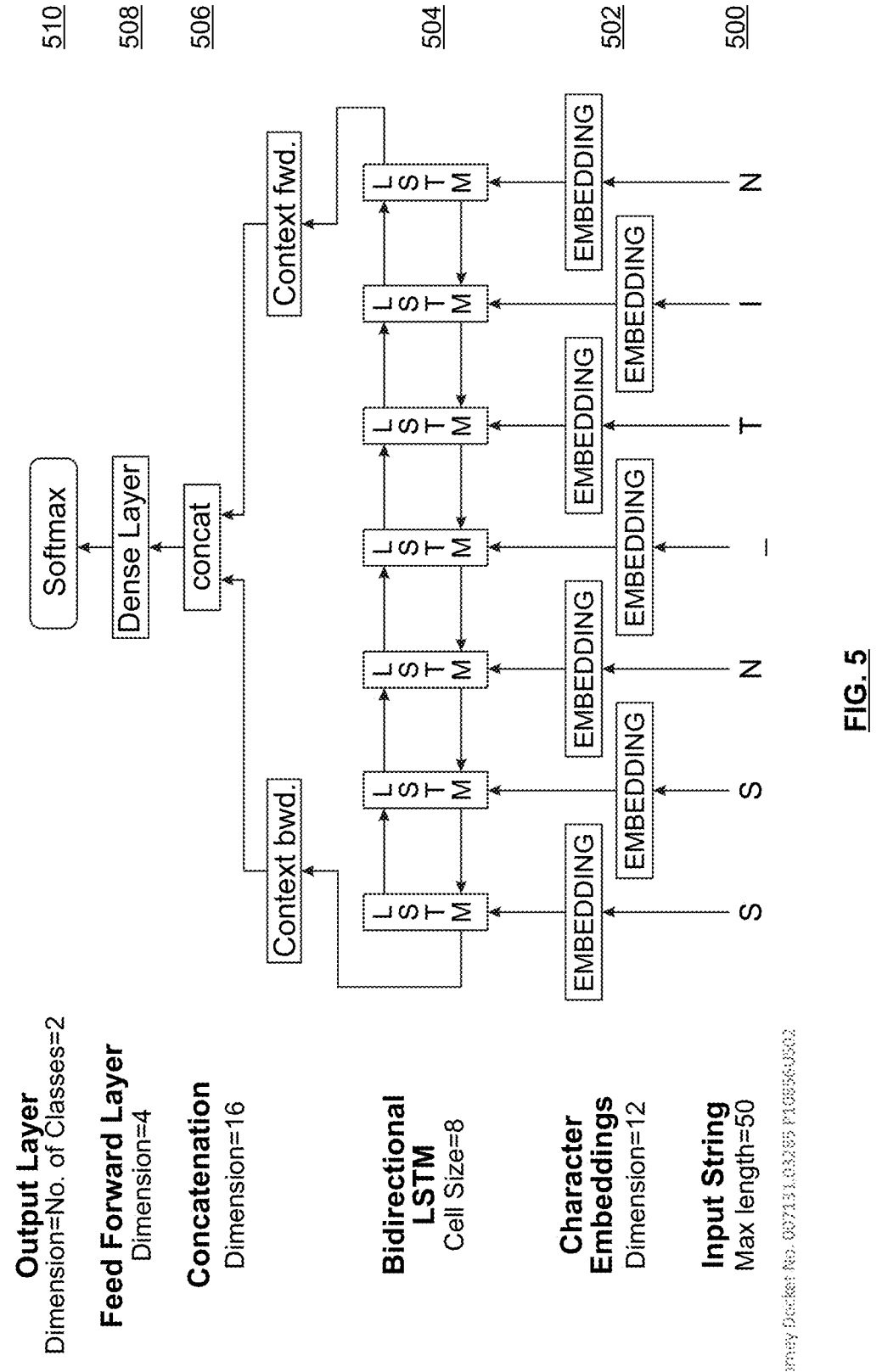
FIG. 5 shows additional granular detail and depicts lower-level functionality of the artificial intelligence steps shown in the flow diagram of FIG. 3 in which feed forwarding and concatenation is performed in accordance with certain aspects of the present disclosure.

FIG. 5 shows additional granular detail and depicts lower-level functionality of the artificial intelligence steps shown in the flow diagram of FIG. 3 in which feed forwarding and concatenation is performed in accordance with certain aspects of the present disclosure. In this example, metadata is input 500, characters are embedded 502, and bidirectional LSTM is performed 504 like corresponding actions in FIG. 4 of 400, 402, and 404.

However, instead of averaging the forward and backward contextualizations output from the bidirectional LSTM, they can be concatenated together 506. A feed forward layer can produce a dense layer result 508, which is then input into the softmax activation or the like function 510 in order generate such as in FIG. 4.

A person of skill in the art will recognize that the softmax function, also known as softargmax or normalized exponential function, is a generalization of the logistic function to multiple dimensions. It is used in multinomial logistic regression and is often used as the last activation function of a neural network to normalize the output of a network to a probability distribution over predicted output classes. The softmax function takes as input a vector z of K real numbers (such as the element-wise average 408 of FIG. 4 or the feed forward 508 of FIG. 5) and normalizes them into a probability distribution consisting of K probabilities proportional to the exponentials of the input numbers.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. An artificial-intelligence method for an application to predict whether personal data may be present in structured software comprising the steps of:

(a) natural-language processing, by a preprocessing layer in the application, a metadata field in the structured software into a normalized input sequence;

(b) embedding, by an embedding layer in the application, individual characters in the normalized input sequence into fixed-dimension vectors of real numbers in order to generate an embedding matrix;

(c) generating, by a supervised machine-learning layer in the application, a machine-learned vector based on the embedding matrix;

(d) processing, by a processing layer, the machine-learned vector by element-wise averaging or feed forwarding into an output argument; and (e) outputting, by an output layer in the application based on the output argument, a two-node neural-network output that indicates a probability of whether the structured software contains said personal data, wherein the supervised machine-learning layer is a bidirectional Long Short Term Memory (LSTM) layer that computes, based on the embedding matrix, a forward LSTM and a backward LSTM, wherein machine-learned vector is an averaged vector generated by the bidirectional LSTM layer based on the forward LSTM and the backward LST, wherein the bidirectional LSTM layer includes at least one LSTM unit, and wherein each said at least one LSTM unit includes a cell for temporarily storing at least one value over one or more time intervals as well as an input gate, an output gate, and a forget gate in which the gates regulate a flow of information into and out of the cell.

2. The artificial-intelligence method of claim 1 wherein each said at least one LSTM unit includes a cell for temporarily storing at least one value over one or more time intervals as well as an input gate, an output gate, and a forget gate in which the gates regulate a flow of information into and out of the cell.

3. The artificial-intelligence method of claim 2 wherein the natural language processing includes whitespace stripping of the metadata field in order to form the normalized input sequence.

4. The artificial-intelligence method of claim 2 wherein the natural language processing includes case conversion of the metadata field to provide case uniformity in order to form the normalized input sequence.

5. The artificial-intelligence method of claim 2 wherein the natural language processing includes tokenization of one or more names within the metadata field at a character level and conversion of characters in the metadata field into integer indices in order to form the normalized input sequence.

6. The artificial-intelligence method of claim 2 in which the normalized input sequence has a length and wherein the natural language processing includes padding the normalized input sequence if the length is below a threshold and truncating a trailing end of the normalized input sequence if the length is greater than the threshold.

7. The artificial-intelligence method of claim 2 in which the steps of the application are implemented as computer-executable instructions on computer-readable media.

8. The artificial-intelligence method of claim 7 in which the structured software is a spreadsheet or comma-separated-value (CSV) file, and the metadata field is a column heading in the spreadsheet or CSV file.

9. An artificial-intelligence machine to predict whether personal data may be present in structured software comprising:

a. a processor, b. a communication interface communicatively coupled to the processor;

c. memory communicatively coupled to the communication interface, said memory storing computer-readable instructions that, when executed by the processor, cause the machine to:

i. access, by the processor via the communication interface, at least one metadata field in the structured software;

ii. store, by the processor in the memory, said at least one metadata field;

iii. natural language process, by the processor via a preprocessing layer, said at least one metadata field in the structured software into a normalized input sequence;

iv. store, by the processor in the memory, the normalized input sequence;

v. embed, by the processor via an embedding layer, individual characters in the normalized input sequence into fixed-dimension vectors of real numbers in order to generate an embedding matrix;

vi. store, by the processor in the memory, the embedding matrix;

vii. generate, by the processor via a supervised machine-learning layer, a machine-learned vector based on the embedding matrix;

viii. store, by the processor in the memory, the machine-learned vector; and ix. predict, by the processor based on the machine-learned vector, whether the structured software potentially includes said personal data wherein the prediction of whether the structured software potentially includes said personal data is a two-node binary output wherein the prediction of whether the structured software potentially includes said personal data is a likelihood percentage, wherein the supervised machine-learning layer is a bidirectional Long Short Term Memory (LSTM) layer in which the processor computes, based on the embedding matrix, a forward LSTM and a backward LSTM, wherein machine-learned vector is an averaged vector generated by the bidirectional LSTM layer based on the forward LSTM and the backward LST, and wherein the bidirectional LSTM layer includes at least one LSTM unit.

10. The artificial-intelligence machine of claim 9 wherein each said at least one LSTM unit includes a cell for temporarily storing at least one value over one or more time intervals as well as an input gate, an output gate, and a forget gate in which the gates regulate a flow of information into and out of the cell.

11. The artificial-intelligence machine of claim 10 wherein the natural language process performed by the processor via the preprocessing layer includes:

a. whitespace stripping of said at least one metadata field;

b. case conversion of said at least one metadata field;

c. tokenization of one or more names within said at least one metadata field at a character level and conversion of characters in said at least one metadata field into integer indices; and d. padding or truncating the normalized input sequence in order to match a predetermined length.

12. A non-transitory computer-readable medium storing computer-executable artificial-intelligence instructions for predicting whether personal data may be contained in a structured software file based on metadata contained therein, said computer-executable instructions comprising:

(a) natural language pre-processing instructions to create normalized input sequences out of a plurality of column-heading metadata corresponding to a plurality of column data values, wherein the natural language pre-processing instructions include whitespace stripping of the column-heading metadata in order to form the normalized input sequences, case conversion of the column-heading metadata to provide case uniformity in order to form the normalized input sequences, tokenization of one or more names within the column-heading metadata at a character level and conversion of characters in the column-heading metadata into integer indices in order to form the normalized input sequences, and padding the normalized input sequences if a length is below a threshold and truncating a trailing end of the normalized input sequences if the length is greater than the threshold;

(b) embedding instructions to embed individual characters in the normalized input sequences into fixed-dimension vectors of real numbers in order to generate embedding matrices, wherein the bidirectional Long Short Term Memory (LSTM) instructions include at least one LSTM unit, and wherein each said at least one LSTM unit includes a cell for temporarily storing at least one value over one or more time intervals as well as an input gate, an output gate, and a forget gate in which the gates regulate a flow of information into and out of the cell;

(c) bidirectional Long Short Term Memory (LSTM) instructions to generate forward LSTMs and backward LSTMs out of the embedding matrices;

(d) concatenating instructions to concatenate the forward LSTMs and the backward LSTMs into concatenations;

(e) feed-forward instructions to create dense layers out of the concatenations; and (f) softmax instructions to provide one or more predictions of whether said personal data may be contained in one or more of the column data values corresponding to the column-heading metadata.

\* \* \* \* \*